(12) United States Patent
Karode et al.

(10) Patent No.: US 12,296,295 B2
(45) Date of Patent: May 13, 2025

(54) MEMBRANE SWEEP WITH INTERNAL REHEAT OF SWEEP GAS

(71) Applicant: Air Liquide Advanced Technologies, U.S. LLC, Houston, TX (US)

(72) Inventors: Sandeep K Karode, Boothwyn, PA (US); Benjamin Bikson, Newton, MA (US); Michael E. Bailey, Wilmington, DE (US); Manuel Arruda, North Easton, MA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 380 days.

(21) Appl. No.: 17/978,742

(22) Filed: Nov. 1, 2022

(65) Prior Publication Data

US 2024/0139671 A1  May 2, 2024

(51) Int. Cl.
*B01D 53/22* (2006.01)
*B01D 63/04* (2006.01)

(52) U.S. Cl.
CPC ......... *B01D 53/228* (2013.01); *B01D 53/226* (2013.01); *B01D 63/043* (2013.01); *B01D 2256/24* (2013.01); *B01D 2257/7025* (2013.01); *B01D 2257/80* (2013.01); *B01D 2311/13* (2013.01); *B01D 2313/21* (2013.01)

(58) Field of Classification Search
CPC .. B01D 53/228; B01D 53/226; B01D 63/043; B01D 2256/24; B01D 2257/7025; B01D 2257/80; B01D 2311/13; B01D 2313/21
See application file for complete search history.

(56) References Cited

U.S. PATENT DOCUMENTS

| | | | | |
|---|---|---|---|---|
| 2,894,879 | A * | 7/1959 | Hickman | B01D 3/24 196/115 |
| 5,314,528 | A | 5/1994 | Monereau | |
| 5,525,143 | A | 6/1996 | Morgan et al. | |
| 8,778,062 | B1 * | 7/2014 | Snow, Jr. | B01D 53/22 96/417 |
| 2005/0211097 | A1 | 9/2005 | Eckman | |
| 2011/0062082 | A1 * | 3/2011 | Mordukhovich | B01D 63/0822 210/651 |
| 2011/0073546 | A1 * | 3/2011 | Mordukhovich | B01D 17/085 210/651 |
| 2012/0028878 | A1 * | 2/2012 | Bolton | B01D 61/364 210/151 |
| 2012/0067211 | A1 * | 3/2012 | Tessier | C01B 3/505 95/55 |
| 2012/0111051 | A1 * | 5/2012 | Kulkarni | B01D 53/226 62/619 |
| 2012/0273417 | A1 * | 11/2012 | McGinnis | B01D 61/364 210/637 |
| 2012/0304856 | A1 * | 12/2012 | Kanetsuki | B01D 53/228 95/47 |
| 2014/0073718 | A1 * | 3/2014 | Carpenter | B01D 61/36 523/310 |
| 2014/0157985 | A1 * | 6/2014 | Scovazzo | B01D 53/22 95/52 |
| 2020/0009500 | A1 * | 1/2020 | Liu | B01D 69/02 |
| 2021/0069651 | A1 * | 3/2021 | Liu | H01M 8/04149 |

* cited by examiner

*Primary Examiner* — Anthony R Shumate
(74) *Attorney, Agent, or Firm* — Allen E. White; Christopher J. Cronin

(57) ABSTRACT

Internally reheated sweep gas-aided membrane gas separation module in which the sweep gas is expanded retentate that is warmed through heat exchange with non-expanded retentate within the module.

6 Claims, 4 Drawing Sheets

MEMBRANE SWEEP WITH INTERNAL REHEAT OF SWEEP GAS

CROSS-REFERENCE TO RELATED APPLICATIONS

None.

BACKGROUND

Field of the Invention

The present invention relates to the use of a sweep gas with gas separation membranes.

Related Art

Gas separation membrane modules have long been used to separate a mixture of first and second gases into a product gas enriched in the first, valuable, gas and a vent gas enriched in the second, typically not as valuable, gas. In particular, the physical and chemical properties of the first and second gases and the material properties of the membrane (especially the separation layer of the membrane) are of primary importance in determining the fluxes of the first and second gases across the membrane.

A particularly desirable separation is one in which the flux of one of the gases (such as the second gas) across the membrane is much higher than that of the other of the gases (such as the first gas). The membrane in this case is said to be selective for the second gas over the first gas. The flux of the second gas across the membrane through permeation is affected by the difference in the partial pressure (i.e., the partial pressure difference) of the second gas across the membrane. The flux (or driving force of the membrane) goes up with an increased partial pressure difference while the converse is also true.

The partial pressure difference may be increased by increasing feed gas pressure while maintaining the permeate pressure at the same level. While this may be a satisfactory solution for some separations, this requires a greater amount of compression and thus increases the operating expense for such a system. With the exception of gases having very low inversion temperatures, such as hydrogen and helium, the relatively greater amount of Joule-Thomson cooling caused by this greater partial pressure difference can result in undesirable cooling of the membrane and potentially condensation of condensable components of the gas mixture on the feed side of the membrane. For a system in which the feed gas pressure is fixed and the permeate gas pressure is controlled, the permeate pressure may be lowered. While this may be a satisfactory solution for some separations, this results in a lower pressure permeate gas that may need to be recompressed in order to reach the desired pressure level. Similar to increasing the feed pressure (as explained above), this may result in an undesirable level of cooling of the membrane and potential condensation of condensable components on the feed side of the membrane.

Another way to increase the flux of a gas (such as the second gas) across the membrane is to introduce a sweep gas on the permeate side of the membrane. Assuming that the permeate pressure is controlled, introduction of the sweep gas into the permeate side of the membrane results in dilution of the permeated gas (on the permeate side), thereby lowering its partial pressure. Typically, the sweep gas is an inert gas. Some have proposed the use of an amount of the retentate gas, which is enriched in the first gas, as a sweep gas.

U.S. Pat. No. 5,314,528 discloses a fiber membrane module with a permeate side sweep to significantly enhance the amount of permeate recovered by the membrane module. U.S. Pat. No. 5,525,143 discloses a device utilizing a permeate side sweep with the feed fluid in communication with the bores of fiber membranes and a permeate side sweep of the outer surface of the hollow fibers.

It may be desirable to provide a permeate side sweep with the membrane bores as the permeate side, because the membrane bores comprise a smaller relative volume than the volume around the outer surfaces of the membranes. Such an application may reduce the required volume of sweep fluid. Additionally, such smaller volumes may provide enhanced control of the partial pressures of the sweep fluid and the permeate. Further, providing a device with multiple stages of permeate side sweep can provide incrementally higher permeate fluid yield over existing devices. US 2005/0211097 discloses an gas separation membrane module such a device.

While the use of an amount of retentate as sweep gas may provide several benefits, it is not without its disadvantages. If the dewpoints of condensable components in the retentate are not sufficiently high enough, expansion of the retentate sweep gas to the pressure of the permeate side of the gas separation membrane module may cause those condensable components to condense. If this occurs on the surface of the membrane, damage to the membrane may ensue.

Accordingly, it is an object of the invention to provide a permeate side sweep device utilizing an amount of retentate that avoids condensation of condensable components of the retentate upon expansion to the permeate pressure.

SUMMARY

There is disclosed a double-ended, counter-flow gas separation membrane module with internally reheated sweep gas, comprising: a tubular pressure vessel having a feed gas inlet and a retentate gas outlet formed therein; a left side end cap sealing a left side end of the tubular pressure vessel and comprising a left side permeate outlet; a right side end cap sealing a right side of the tubular pressure vessel and comprising a right side permeate outlet; a first membrane element concentrically disposed concentrically within the tubular pressure vessel and comprising:

a first end facing a middle of the tubular pressure vessel;
   a second end facing the left side of the tubular pressure vessel;
   a plurality of hollow fiber membranes arranged around a hollow porous center tube having a first end facing the middle of the tubular pressure vessel and a second plugged end;
   a permeate tube concentrically disposed within the hollow porous center tube of the first membrane element;
   a nub, made of a polymeric material, formed around the first end of the first membrane element, wherein ends of the plurality of hollow fiber membranes of the first membrane element adjacent the nub thereof fluidly communicate in gas-tight fashion with an interior of the permeate tube of the first membrane element;
   an annular cap sealed against an inwardly-facing face of the nub of the first membrane element that is adjacent the middle of the pressure vessel such that a permeate collection space is defined therebetween and which open bores of the plurality of hollow fiber membranes of the first membrane element fluidly communicate therewith; and a tubesheet made of a polymeric material that is formed around the second end of the first membrane element, wherein open bores of the plurality of hollow fiber membranes at ends thereof that are adjacent the second end of the first membrane element are plugged by the polymeric material of the tubesheet;

The module further comprises a second membrane element concentrically disposed concentrically within the tubular pressure vessel and comprising:

a first end facing the middle of the tubular pressure vessel;

a second end facing the right side of the tubular pressure vessel;

a plurality of hollow fiber membranes arranged around a hollow porous center tube having a first end facing a middle of the tubular pressure vessel and a second plugged end;

a permeate tube concentrically disposed within the hollow porous center tube of the second membrane element;

a nub, made of a polymeric material, formed around the first end of the second membrane element, wherein ends of the plurality of hollow fiber membranes of the second membrane element adjacent the nub thereof fluidly communicate in gas-tight fashion with an interior of the permeate tube of the second membrane element;

an annular cap sealed against an inwardly-facing face of the nub of the second membrane element that is adjacent the middle of the pressure vessel such that a permeate collection space is defined therebetween and which open bores of the plurality of hollow fiber membranes of the second membrane element fluidly communicate therewith; and a tubesheet made of a polymeric material that is formed around the second end of the second membrane element, wherein open bores of the plurality of hollow fiber membranes at ends thereof that are adjacent the second end of the second membrane element are plugged by the polymeric material of the tubesheet;

The module further comprises a branched feed gas pipe fluidly communicating, in gas-tight fashion, between the feed gas inlet and each of the first ends of the hollow porous center tubes; a left-side permeate outlet pipe fluidly communicating, in gas-tight fashion, with the first membrane element permeate tube and extending through the left-side permeate outlet in gas-tight fashion; a right-side permeate outlet pipe fluidly communicating, in gas-tight fashion, with the second membrane element permeate tube and extending through the right-side permeate outlet in gas-tight fashion; a retentate outlet pipe fluidly communicating between the retentate outlet and a retentate collection space disposed between an inner surface of the tubular pressure vessels and outer surfaces of the first and second membrane elements; a first heat exchanger tube having a pressure reduction valve or orifice disposed at a first end thereof and which penetrates the annular cap of the first membrane element so as to fluidly communicate with the permeate collection space thereof; and a second heat exchanger tube having a pressure reduction valve or orifice disposed at a first end thereof and which penetrates the annular cap of the second membrane element so as to fluidly communicate with the permeate collection space thereof.

There is also disclosed a method of dew pointing natural gas aboard a floating production storage and offloading vessel using a gas separation module utilizing an internally reheated sweep gas. The method comprising the following steps. A gas separation membrane module is provided comprising a pressure vessel enclosing two membrane elements each of which comprises a plurality of hollow fiber gas separation membranes extending between a polymeric nub on one end of the respective membrane element and a polymeric tubesheet on the other end of the respective membrane element and also enclosing two heat exchangers each of which has a pressure reduction valve or orifice at a first end in fluid communication with a retentate gas space of the module and a second end in fluid communication with a permeate gas space of the module. A stream of a gas mixture, comprising $C_{3+}$ hydrocarbons and methane, is fed to a feed gas inlet of the module that is centrally disposed with respect to a longitudinal axis of the module, the gas mixture having a first dew point. The stream of the gas mixture is separated, with the module, into a C3+ hydrocarbons enriched and methane deficient permeate gas and a methane enriched and C3+ hydrocarbons deficient retentate gas. The permeate gas is withdrawn from first and second permeate outlet pipes disposed at opposite ends of the module. A main portion of retentate gas is withdrawn from a retentate outlet of the module, the main portion having a second dew point lower than the first dew point. A permeate gas space of the gas module is swept by a remaining portion of the retentate gas without resulting in condensation of C3+ hydrocarbons in the permeate gas space through expansion of the remaining portion by the pressure reduction valve or orifice, warming of the expanded remaining portion through heat exchange with the main portion of the retentate gas in the retentate gas space, and introduction of the warmed expanded remaining portion into the permeate gas space.

There is also disclosed another method of gas separation utilizing an internally reheated sweep gas, comprising the following steps. The above-disclosed double-ended, counter-flow gas separation membrane module is provided with internally reheated sweep gas; A stream of a gas mixture is fed to the branched feed gas pipe, the gas mixture comprising first and second gases. A permeate gas is withdrawn from the right and left-side permeate outlet pipes that is enriched in the first gas in comparison to the gas mixture. A retentate gas is withdrawn from the retentate outlet that is enriched in the second gas in comparison to the gas mixture.

Any one or more the module and the methods may include one or more of the following aspects:

each of the plurality of hollow fiber membranes of the first and second membrane elements are selective for water and $C_{3+}$ hydrocarbons over methane.

the gas mixture is natural gas, the first gas is $C_{3+}$ hydrocarbons and the second gas is $CH_4$.

the method is performed aboard a floating production storage and offloading vessel.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
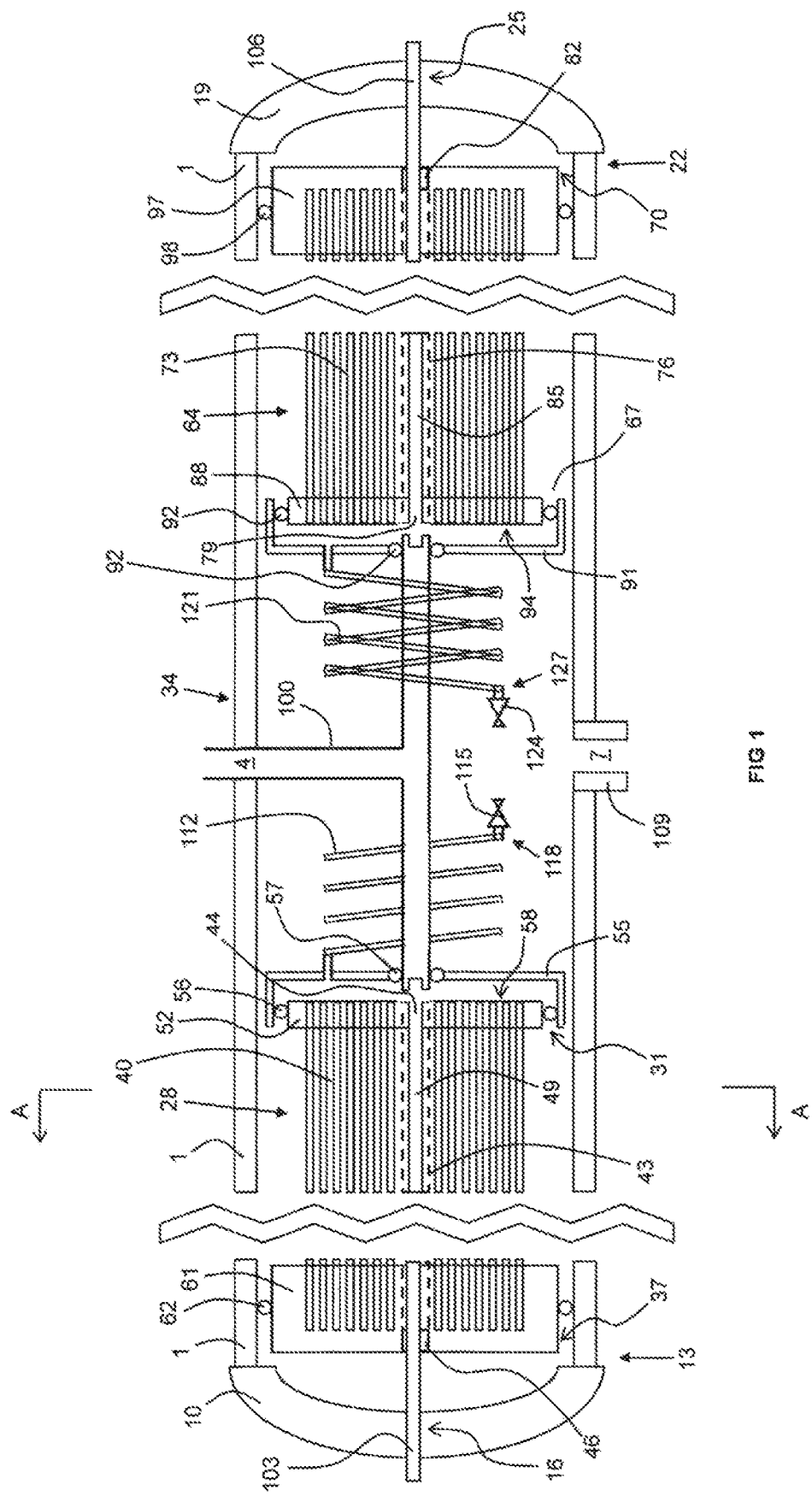
FIG. 1 is a cross-sectional elevation view with parts broken away of a doubled-ended embodiment of a gas separation membrane module within the scope of the invention.

We propose the use of an internal heat exchanger in the retentate side of the gas separation module that allows the expanded retentate for use as a sweep gas to be warmed by the non-expanded retentate. In the context of a flow of retentate gas to the permeate side of the module, at or adjacent to an upstream end of the heat exchanger is an expansion valve or orifice for expanding the relatively higher pressure retentate down to the pressure of the permeate. Due to Joule-Thomson cooling of the rententate upon expansion to the permeate pressure, the retentate downstream of the expansion valve or orifice is relatively colder than the non-expanded retentate and condensable components may even condense in the heat exchanger. However, as the expanded retentate flows down the length of the heat exchanger, it is warmed by the relatively warmer temperature non-expanded retentate on the exterior surface of the heat exchanger. Typically, the heat exchanger is a tube.

Because the path of the retentate gas used as a sweep gas is exclusively internal to the gas separation membrane module, there is no need to tap an outer surface of the gas separation membrane for introducing an amount of the retentate to the permeate side of the membrane. An external tap is costly, complicated, and introduces another opportunity for a leak.

Selection of the inner diameter, wall thickness, and length of the heat exchanger and the thermal conductivity of the material with which the heat exchanger is comprised of is a function of the required degree of heat exchange between the expanded and non-expanded retenate. Those skilled in the art will recognize that the required degree of heat transfer is a function of the difference in temperatures between the expanded and non-expanded retentate and the dewpoints of condensable components in the retentate. They will recognize that, for a given feed gas composition and pressure and a given permeate pressure, if condensable components are still condensing on the permeate side of the membrane, the wall thickness of the heat exchanger may be decreased, the length of the heat exchanger may be increased, and/or a material with a higher thermal conductivity may be used for the heat exchanger.

While the invention may be used for any membrane-based gas separation, typically the feed gas is natural gas. Typically, natural gas includes, on a dry basis, 60-90 vol. % $CH_4$, 0-20 vol % ethane, 0-20 vol % propane, 0-20 vol % butane, 0-30 vol. % $CO_2$, and 0-5 vol % $H_2S$, 0-0.2 vol % $O_2$, 0-5 vol % $N_2$, and 0-2 vol % Argon/Helium. Let us consider an example of a feed gas containing 40 vol. % $CO_2$. If $CO_2$ and $C_{3+}$ hydrocarbon selective membrane is used, the retentate may be expected to contain approximately 30 vol. % $CO_2$ and a significant amount of heavy hydrocarbons (e.g., a dewpoint, at pressure, of approximately 25° C.). If the retenate is expanded from the feed gas pressure of 75 bar to the permeate pressure of 4 bar for use as a sweep gas, significant Joule-Thomson cooling will result. For example, such a sweep gas may reach a temperature of −7° C. Without the benefit of the heat transfer between the expanded and non-expanded retentate, the Joule-Thomson cooling would otherwise result in condensation of $C_{3+}$ hydrocarbons at the inlet of the sweep stream into the bore side of the membranes.

The gas separation module implementing the invention may be a so-called double-ender in which a gas mixture comprising first and second gases is fed to two membrane elements in parallel from a central region of the module and a permeate gas is withdrawn from a first and second ends of the module. Alternatively, the module implementing the invention may be a so-called single-ender in which the gas mixture is fed to one or more membrane elements in series.

The invention is particularly suited for dew pointing of a gas mixture containing amounts of condensable gases, such as $C_{3+}$ hydrocarbons, and amounts of incondensable gases, such as methane. The dew pointing process is important for protecting vulnerable downstream gas separation membranes for removal of other impurities, such as $CO_2$. If the gas mixture is not first dew pointed to remove amounts of the condensable gases, those gases may condense upon the surface of the downstream gas separation membranes causing damage to them. In conventional dew pointing methods utilizing a portion of the retentate gas as a sweep gas to boost permeation of the condensable gas through the membrane, as that portion of the retentate gas is expanded to the lower pressure of the permeate gas, Joule-Thomson cooling of the expanded portion may result in condensation of the condensable gases. Thus, the problem sought to be avoided by dew pointing is just created at the dew pointing step. Therefore, either the dew pointing gas separation module must not be sweep or a two-step dew pointing process must be used with the first step being equipment such as a chiller. For implementation of the method aboard a floating production storage and offloading (FPSO) vessel, this unsatisfactorily increases the footprint of the gas processing equipment when surface area is already at a premium because it must be contained aboard the limited-size vessel.

The invention avoids the aforementioned problem by reheating the remaining portion of the expanded retentate gas to be used a sweep gas through heat exchange with the main, non-expanded, portion of the retentate gas across the wall of a heat exchanger that is disposed within the retentate gas space and pressure vessel of the gas separation module. Hence, we call it an internally swept gas separation module. The invention is particularly suitable for dew pointing of natural gas in which the condensable gases are $C_{3+}$ hydrocarbons and the incondensable gas includes methane and $CO_2$. Membranes for such an application of the invention would of course be selective for $C_{3+}$ hydrocarbons over methane.

We will now describe a particular embodiment of the invention.

As best shown in FIG. 1, the double-ended, counter-flow gas separation membrane module with internally reheated sweep gas is as follows. A tubular pressure vessel 1 has a feed gas inlet 4 and a retentate gas outlet 7 formed in it. A left side end cap 10 seals a left side end 13 of the tubular pressure vessel 1 and includes a left side permeate outlet 16. Also, a right side end cap seals a right side 22 of the tubular pressure vessel 1 and includes a right side permeate outlet 25.

The module includes two membrane elements 28, 64.

A first membrane element 28 is concentrically disposed concentrically within the tubular pressure vessel 1. It has a first end 31 facing a middle 34 of the tubular pressure vessel 1 and a second end 37 facing the left side 13 of the tubular pressure vessel 1. Element 28 also includes a plurality of hollow fiber membranes 40 that are arranged around a hollow porous center tube 43 that has a first end 44 facing the middle 34 of the tubular pressure vessel 1 and a second plugged end 46. Element 28 also includes a permeate tube 49 is concentrically disposed within the hollow porous center tube 43. Element 28 further includes a polymeric nub 52 is formed around the first end 34 of the first membrane element 28. Ends of the plurality of hollow fiber membranes 40 that are adjacent the nub 52 fluidly communicate in gas-tight fashion with an interior of the permeate tube 49. Element 28 includes an annular cap 55 that is sealed against an inwardly-facing face 58, of the nub 52, that is adjacent the middle 34 of the pressure vessel 1. A permeate collection space is defined between an interior surface of the cap 55 facing away from the middle 34 of the pressure vessel 1 and the inwardly-facing face 58 of the nub 52. This permeate collection space is in fluid communication with open bores of the plurality of membranes 40. The permeate collection space is sealed from a retentate gas space of the module (where retentate gas may flow) by the presence of the cap 55, the nub 52, and two sealing elements 56, 57, such as O-rings or equivalent sealing means. Finally, element 28 includes a polymeric tubesheet 61 that is formed around the second end 37 of element 28. The bores of the membranes 40 at ends adjacent the second end 37 of element 28 are plugged by the polymeric material of the tubesheet.

Similarly, the second membrane element 64 is concentrically disposed concentrically within the tubular pressure vessel 1. It has a first end 67 facing the middle 34 of the tubular pressure vessel 1 and a second end 70 facing the right side 22 of the tubular pressure vessel 1. Element 64 also includes a plurality of hollow fiber membranes 73 that are arranged around a hollow porous center tube 76 that has a first end 79 facing a middle 34 of the tubular pressure vessel 1 and a second plugged end 82. Element 64 further includes a permeate tube 85 that is concentrically disposed within the hollow porous center tube 76. Element also includes a nub 88, made of a polymeric material, that is formed around the first end 67 thereof. Bores of ends of the membranes 73 that are adjacent the nub 88 fluidly communicate in gas-tight fashion with an interior of the permeate tube 85. Element 64 also includes an annular cap 91 that is sealed against an inwardly-facing face 94 of the nub 88 that is adjacent the middle 34 of the pressure vessel 1. A permeate collection space is defined between face 94 and an inner surface of the cap 91 that faces away from the middle 34 of the pressure vessel 1. Open bores of the membranes 73 fluidly communicate with that permeate collection space. Finally, element 64 includes a polymeric tubesheet 97 that is formed around the second end 70. Ends of the membranes 73 that are adjacent the second end 70 of element 64 are plugged by the polymeric material of the tubesheet 97.

A branched feed gas pipe 100 that fluidly communicates, in gas-tight fashion, between the feed gas inlet 4 and each of the first ends 43, 79 of the hollow porous center tubes 43, 76.

A left-side permeate outlet pipe 103 fluidly communicates, in gas-tight fashion, with permeate tube 49 and extends through the left-side permeate outlet 46 in gas-tight fashion with a sealing element (not illustrated), such as an O-ring. Similarly, a right-side permeate outlet pipe 106 fluidly communicates, in gas-tight fashion, with permeate tube 85 and extends through the right-side permeate outlet 25 in gas-tight fashion with a similar sealing element.

Aa retentate outlet pipe 109 fluidly communicates between the retentate outlet 7 and a retentate gas space space that is disposed between an inner surface of the tubular pressure vessels and outer surfaces of the first and second membrane elements 28, 64.

A first heat exchanger tube 112 has a pressure reduction valve or orifice 115 disposed at a first end thereof 118. Tube 112 penetrates the annular cap 55 in gas-tight fashion so as to fluidly communicate with the permeate collection space defined by the cap 55 and face 58. Similarly, a second heat exchanger tube 121 has a pressure reduction valve or orifice 124 disposed at a first end 127 thereof. Tube 121 penetrates annular cap 91 so as to fluidly communicate with the permeate collection space defined by the cap 91 and face 94.

Figure 2:
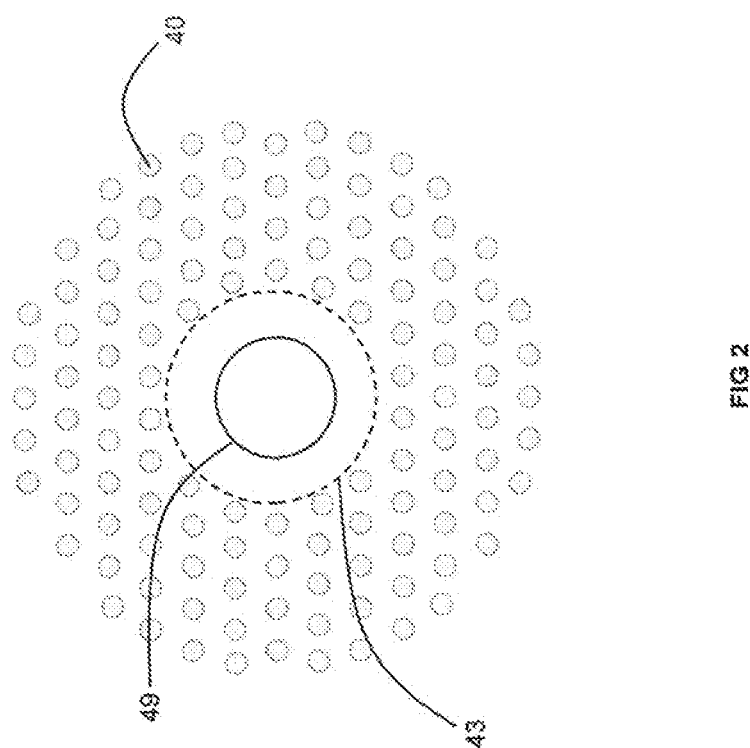
FIG. 2 is a cross-sectional end view of the first membrane element of FIG. 1 taken along line A-A.
Figure 3:
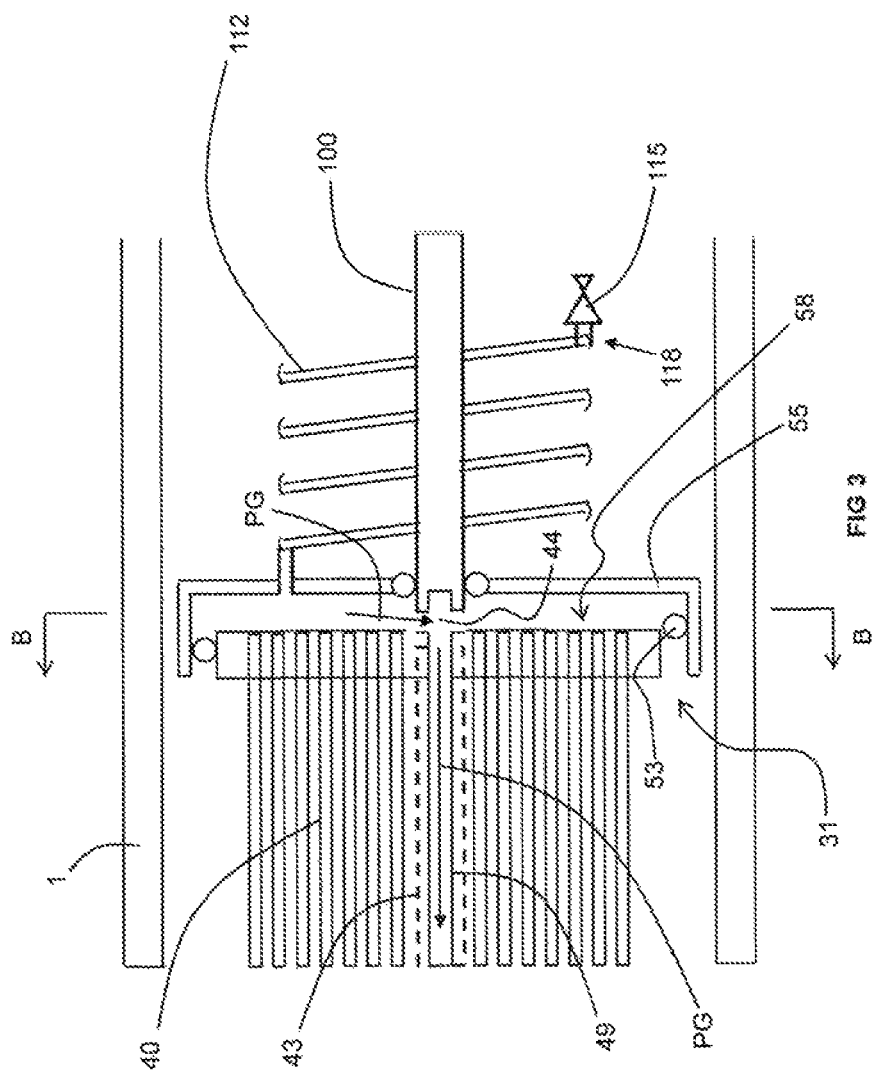
FIG. 3 is a partial expanded cross-sectional elevation view of the gas separation membrane module of FIG. 1.

In operation, a feed gas is fed to the module via the feed gas inlet 4 and pipe 100. From pipe 100, the feed gas flows into an open end of the porous hollow center tubes 43, 76. As best seen in FIG. 2, an annular space is defined between the non-porous permeate tube 49 of element 28 and the porous hollow center tube 43. The feed gas can flow into the annular space but is prevented from leaking into the permeate gas space by the presence of permeate tube 49. While not illustrated, the same behavior is true for the porous hollow center tube 76 and permeate tube 85 of element 64.

Because the hollow center tubes 43, 76 are porous, the feed gas flows out of tubes 43, 76 and into spaces in between adjacent ones of the plurality of membranes 40, 73. The fast gases preferentially permeate cross the walls of the membranes 40, 73 and into open bores thereof, while the slow gases preferentially accumulate and enrich in the retentate gas space. With regard to element 28, the feed gas fed from the right side 31 of element 28 thus flows towards the left side 37 of element 28. Because the bores of ends of the membranes 40 that are adjacent the left side 37 of element 28 are plugged by the polymeric material of the tubesheet 61 and the bores of ends of the membranes 40 that are adjacent the right side 31 of element 28 are open, permeate gas flows from left to right through the bores of members 40 in a direction opposite the flow direction of the feed gas. Such a flow configuration is of course counter-current. With regard to element 64, the feed gas fed from the left side 67 of element 28 thus flows towards the right side 70 of element 64. Because the bores of ends of the membranes 73 that are adjacent the right side 70 of element 64 are plugged by the polymeric material of the tubesheet 97 and the bores of ends of the membranes 73 that are adjacent the left side 67 of element 64 are open, permeate gas flows from right to left through the bores of members 73 in a direction opposite the flow direction of the feed gas. Again, such a flow configuration is of course counter-current.

Figure 4:
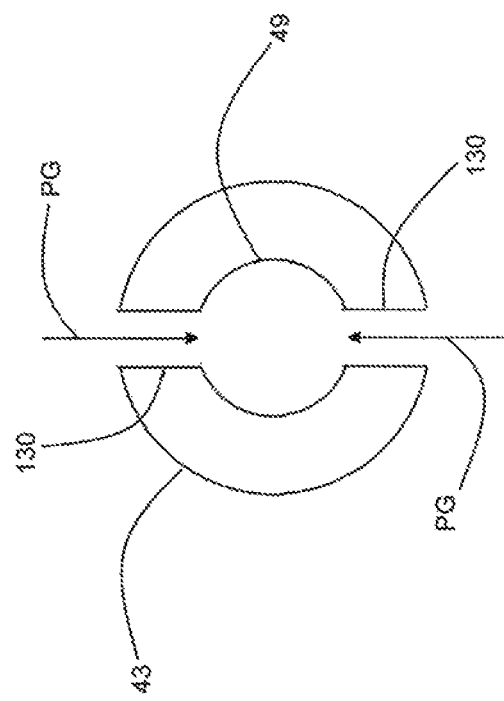
FIG. 4 is a cross-sectional end view of the hollow porous center tube and permeate tube of the first membrane element of FIG. 1 taken along line B-B.

The nature of the structural relationship between permeate tube 49 and porous hollow center tube 43 and between permeate tube 85 and porous hollow center tube 76 and how the higher pressure feed gas is prevented from leaking into the permeate gas spaces is not fully apparent in the cross-sectional elevation view of FIG. 1. As best shown in FIG. 4, one or more permeate flow tubes 130 allow a flow of permeate gas PG from the permeate gas collection space associated with nub 52 and cap 55 of element 28 to flow into the interior of permeate tube 49 and prevent the higher pressure feed gas from leaking into permeate tube 49. While not illustrated, the same features are true for the permeate gas collection space, cap 91 and nub 88 of element 64.

The permeate gas flows down the interior of permeate tubes 49, 85 and into interiors of permeate outlet pipes 103, 106 where they may be withdrawn from the module.

While the module may be used for purposes other than dew pointing, typically it is used for dew pointing of a gas mixture that is treated in one or more downstream processing steps using any separation or purification techniques known in the field of gas separation and purification.

Example

In order to simulate the cooling caused by Joule-Thomson expansion of the portion of retentate gas used as a sweep gas and the reheating of the expanded retentate gas by virtue of operation of the invention, an experiment was conducted in which a gas was expanded and reheated it in an oven with temperature measurements taken both of the expanded, pre-warmed gas the post-warmed gas.

The gas used in the simulation was a 70:30 mixture of $N_2:CO_2$ in a standard compressed gas cylinder at room temperature. It was fed into a flow circuit including an expansion valve outside an oven and a ⅜" metal coil within the oven maintained at 40 C. A thermocouple just downstream of the expansion valve was used to measure the post-expansion, pre-warming temperature. A thermocouple near the end of the coil was used to measure the post-warming temperature. The expansion valve was set to an expanded pressure of 4.4 bar. The pre-expansion temperature was assumed to be room temperature. A post-expansion, pre-warming temperature was measured at −7 C.

The mass flow rate of the gas through the circuit was varied and the post-warming temperature was measured. The results are listed in Table 1.

TABLE 1 effect of mass flow rate upon post-warming temperature

| flow rate (kg/hr) | post-warming temperature |
|---|---|
| 95 | 1.23 C. |
| 90 | 1.62 C. |
| 85 | 2.07 C. |
| 90 | 1.58 C. |
| 95 | 1.17 C. |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A double-ended, counter-flow gas separation membrane module with internally reheated sweep gas, comprising:
   a tubular pressure vessel having a feed gas inlet and a retentate gas outlet formed therein;
   a left side end cap sealing a left side end of the tubular pressure vessel and comprising a left side permeate outlet;
   a right side end cap sealing a right side of the tubular pressure vessel and comprising a right side permeate outlet;
   a first membrane element concentrically disposed concentrically within the tubular pressure vessel and comprising:
      a first end facing a middle of the tubular pressure vessel;
      a second end facing the left side of the tubular pressure vessel;
      a plurality of hollow fiber membranes arranged around a hollow porous center tube having a first end facing the middle of the tubular pressure vessel and a second plugged end;
      a permeate tube concentrically disposed within the hollow porous center tube of the first membrane element;
      a nub, made of a polymeric material, formed around the first end of the first membrane element, wherein ends of the plurality of hollow fiber membranes of the first membrane element adjacent the nub thereof fluidly communicate in gas-tight fashion with an interior of the permeate tube of the first membrane element;
      an annular cap sealed against an inwardly-facing face of the nub of the first membrane element that is adjacent the middle of the pressure vessel such that a permeate collection space is defined therebetween and which open bores of the plurality of hollow fiber membranes of the first membrane element fluidly communicate therewith; and
      a tubesheet made of a polymeric material that is formed around the second end of the first membrane element, wherein open bores of the plurality of hollow fiber membranes at ends thereof that are adjacent the second end of the first membrane element are plugged by the polymeric material of the tubesheet;
   a second membrane element concentrically disposed concentrically within the tubular pressure vessel and comprising:
      a first end facing the middle of the tubular pressure vessel;
      a second end facing the right side of the tubular pressure vessel;

a plurality of hollow fiber membranes arranged around a hollow porous center tube having a first end facing a middle of the tubular pressure vessel and a second plugged end;

a permeate tube concentrically disposed within the hollow porous center tube of the second membrane element;

a nub, made of a polymeric material, formed around the first end of the second membrane element, wherein ends of the plurality of hollow fiber membranes of the second membrane element adjacent the nub thereof fluidly communicate in gas-tight fashion with an interior of the permeate tube of the second membrane element;

an annular cap sealed against an inwardly-facing face of the nub of the second membrane element that is adjacent the middle of the pressure vessel such that a permeate collection space is defined therebetween and which open bores of the plurality of hollow fiber membranes of the second membrane element fluidly communicate therewith; and a tubesheet made of a polymeric material that is formed around the second end of the second membrane element, wherein open bores of the plurality of hollow fiber membranes at ends thereof that are adjacent the second end of the second membrane element are plugged by the polymeric material of the tubesheet;

a branched feed gas pipe fluidly communicating, in gas-tight fashion, between the feed gas inlet and each of the first ends of the hollow porous center tubes;

a left-side permeate outlet pipe fluidly communicating, in gas-tight fashion, with the first membrane element permeate tube and extending through the left-side permeate outlet in gas-tight fashion;

a right-side permeate outlet pipe fluidly communicating, in gas-tight fashion, with the second membrane element permeate tube and extending through the right-side permeate outlet in gas-tight fashion;

a retentate outlet pipe fluidly communicating between the retentate outlet and a retentate collection space disposed between an inner surface of the tubular pressure vessels and outer surfaces of the first and second membrane elements;

a first heat exchanger tube having a pressure reduction valve or orifice disposed at a first end thereof and which penetrates the annular cap of the first membrane element so as to fluidly communicate with the permeate collection space thereof; and a second heat exchanger tube having a pressure reduction valve or orifice disposed at a first end thereof and which penetrates the annular cap of the second membrane element so as to fluidly communicate with the permeate collection space thereof.

2. The membrane module of claim 1, wherein each of the plurality of hollow fiber membranes of the first and second membrane elements are selective for water and $C_{3+}$ hydrocarbons over methane.

3. A method of gas separation utilizing an internally reheated sweep gas, comprising the steps of:

providing the double-ended, counter-flow gas separation membrane module with internally reheated sweep gas of claim 1;

feeding a stream of a gas mixture to the branched feed gas pipe, the gas mixture comprising first and second gases;

withdrawing a permeate gas from the right and left-side permeate outlet pipes that is enriched in the first gas in comparison to the gas mixture; and withdrawing a retentate gas from the retentate outlet that is enriched in the second gas in comparison to the gas mixture.

4. The method of claim 3, wherein the gas mixture is natural gas, the first gas is $C_{3+}$ hydrocarbons and the second gas is $CH_4$.

5. The method of claim 4, wherein said method is performed aboard a floating production storage and offloading vessel.

6. A method of dew pointing natural gas aboard a floating production storage and offloading vessel using a gas separation module utilizing an internally reheated sweep gas, comprising the steps of:

providing a gas separation membrane module comprising a pressure vessel enclosing two membrane elements each of which comprises a plurality of hollow fiber gas separation membranes extending between a polymeric nub on one end of the respective membrane element and a polymeric tubesheet on the other end of the respective membrane element and also enclosing two heat exchangers each of which has a pressure reduction valve or orifice at a first end in fluid communication with a retentate gas space of the module and a second end in fluid communication with a permeate gas space of the module;

feeding a stream of a gas mixture, comprising $C_{3+}$ hydrocarbons and methane, to a feed gas inlet of the module that is centrally disposed with respect to a longitudinal axis of the module, the gas mixture having a first dew point;

separating, with the module, the stream of the gas mixture into a C3+ hydrocarbons enriched and methane deficient permeate gas and a methane enriched and C3+ hydrocarbons deficient retentate gas;

withdrawing the permeate gas from first and second permeate outlet pipes disposed at opposite ends of the module; and withdrawing a main portion of retentate gas from a retentate outlet of the module, the main portion having a second dew point lower than the first dew point, wherein the permeate gas space of the gas module is swept by a remaining portion of the retentate gas without resulting in condensation of C3+ hydrocarbons in the permeate gas space through expansion of the remaining portion by the pressure reduction valve or orifice, warming of the expanded remaining portion through heat exchange with the main portion of the retentate gas in the retentate gas space, and introduction of the warmed expanded remaining portion into the permeate gas space.

* * * * *